(12) United States Patent
Kojima et al.

(10) Patent No.: US 12,307,297 B2
(45) Date of Patent: May 20, 2025

(54) COMPUTER-READABLE RECORDING MEDIUM STORING JOB OPERATION PROGRAM, JOB OPERATION SYSTEM, AND JOB OPERATION METHOD

(71) Applicant: FUJITSU LIMITED, Kawasaki (JP)

(72) Inventors: Naoki Kojima, Kobe (JP); Daiki Yoshikawa, Handa (JP); Yoshihiro Kimura, Kobe (JP); Yukihiro Takeuchi, Akashi (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 17/691,168

(22) Filed: Mar. 10, 2022

(65) Prior Publication Data
US 2023/0020598 A1     Jan. 19, 2023

(30) Foreign Application Priority Data

Jul. 16, 2021     (JP) .................................. 2021-118123

(51) Int. Cl.
*G06F 9/50*     (2006.01)
*G06F 9/48*     (2006.01)

(52) U.S. Cl.
CPC ............ *G06F 9/5038* (2013.01); *G06F 9/485* (2013.01)

(58) Field of Classification Search
CPC ................................ G06F 9/5038; G06F 9/485
See application file for complete search history.

(56) References Cited

U.S. PATENT DOCUMENTS

| 2015/0242234 | A1* | 8/2015  | Harris    | G06F 9/5072 718/1 |
| 2016/0269246 | A1* | 9/2016  | Masuda    | H04L 41/12 |
| 2017/0019462 | A1* | 1/2017  | Hara      | H04L 43/062 |
| 2021/0271520 | A1* | 9/2021  | Basu      | G06N 3/08 |
| 2021/0311655 | A1* | 10/2021 | Benjamin  | G06F 3/0631 |

FOREIGN PATENT DOCUMENTS

| JP | H04-267465 A | 9/1992 |
| JP | 2011-013870 A | 1/2011 |

OTHER PUBLICATIONS

Amazon, AWS Elastic Beanstalk Developer Guide API Version Dec. 1, 2010, Amazon, 2010 (Year: 2010).*
Senju Family, "Senju/DC, mPLAT/SOP", Nomura Research Institute, Ltd., pp. 1-114, 2024, with Partial English Translation.

* cited by examiner

*Primary Examiner* — Dong U Kim
(74) *Attorney, Agent, or Firm* — Fujitsu Intellectual Property Center

(57) ABSTRACT

A non-transitory computer-readable recording medium stores a job operation program for causing a computer to execute processing including: in a case of linking a schedule server that distributes batch processing of executing a plurality of jobs in a predetermined order to a plurality of machines and executes the batch processing with a cloud service equipped with an autoscale function, extracting host information to be autoscaled and an autoscale type using a function service included in the cloud service at a moment of autoscaling of one of the machines; and changing a host list in the schedule server on the basis of the extracted host information and autoscale type.

6 Claims, 10 Drawing Sheets

FIG. 4

```
{
    "id": "12345",                            ←――― EVENT ID
    "detail-type": "Scale out",               ←――― AUTOSCALE TYPE
    "detail": {
        "StatusCode": "InProgress",
        "RequestId": "abcdef123456789",
        "EndTime": "yyyy-mm-ddThh:mm:ssZ",
        "VmInstanceId": "abcdef",             ←――― VIRTUALIZATION INSTANCE ID
        "StartTime": "yyyy-mm-ddThh:mm:ssZ"
    }
}
```

FIG. 5

| HOST GROUP NAME TO CHANGE | HOST NAME TO BE ADDED TO CONFIGURATION HOST |
|---|---|
| hostgroup1 | VMabcdef |

```
POST /Schedule-server/api/v1/contained-hosts HTTP/1.1
Host: xxx.xxx.xxx:9900
Authorization: Basic ********************
Content-Type: application/json {
   "subsystem": 0,
   "hostgroupname": "hostgroup1",   ← HOST GROUP NAME TO CHANGE
   "hostname": "VMabcdef",          ← HOST NAME TO BE ADDED TO
   "maxexec": 4                        CONFIGURATION HOST
}
```

FIG. 6

| HOST GROUP NAME TO CHANGE | HOST NAME TO BE DELETED FROM CONFIGURATION HOST |
|---|---|
| hostgroup1 | VMabcdef |

```
DELETE          /Schesule-server/api/v1/subsystems/0/host-groups/
hostgroup1/contained-hosts/VMabcdef HTTP/1.1
Host: xxx.xxx.xxx:9900
Authorization: Basic ******************
```

— HOST GROUP NAME TO CHANGE  HOST NAME TO BE DELETED FROM CONFIGURATION HOST

COMPUTER-READABLE RECORDING MEDIUM STORING JOB OPERATION PROGRAM, JOB OPERATION SYSTEM, AND JOB OPERATION METHOD

CROSS-REFERENCE TO RELATED APPLICATION

This application is based upon and claims the benefit of priority of the prior Japanese Patent Application No. 2021-118123, filed on Jul. 16, 2021, the entire contents of which are incorporated herein by reference.

FIELD

The present embodiment discussed herein is related to a job operation program and the like.

BACKGROUND

In recent years, with the spread of public clouds, the utility form from on-premises to the clouds is increasing in the field of job management. The job management refers to controlling the activation and termination of a plurality of jobs, monitoring an execution status of each job, and reporting. The jobs include batch processing. By using a cloud autoscale function for the job management, a highly reliable system that takes advantage of elasticity can be easily constructed. Examples of such clouds include Amazon Elastic Compute Cloud (Amazon EC2) (registered trademark) and Microsoft Azure (registered trademark).

Japanese Laid-open Patent Publication No. 4-267465 and Japanese Laid-open Patent Publication No. 2011-13870 are disclosed as related art.

SUMMARY

According to an aspect of the embodiments, a non-transitory computer-readable recording medium stores a job operation program for causing a computer to execute processing including: in a case of linking a schedule server that distributes batch processing of executing a plurality of jobs in a predetermined order to a plurality of machines and executes the batch processing with a cloud service equipped with an autoscale function, extracting host information to be autoscaled and an autoscale type using a function service included in the cloud service at a moment of autoscaling of one of the machines; and changing a host list in the schedule server on the basis of the extracted host information and autoscale type.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of event information of autoscale occurrence;

FIG. 5 is a diagram illustrating an example of a request to add a configuration host;

FIG. 6 is a diagram illustrating an example of a request to delete a configuration host;

DESCRIPTION OF EMBODIMENTS

However, distributed processing and an autoscale function provided by a cloud are known to be unsuitable for offline batch processing operations because they are mechanisms for online processing. Therefore, instead of using the distributed processing and autoscale functions provided by the cloud, job management software is used, which performs distributed execution after preparing in advance resources for the number of execution servers necessary for batch processing. Examples of the job management software include Systemwalker Operation Manager (registered trademark).

Figure 9:
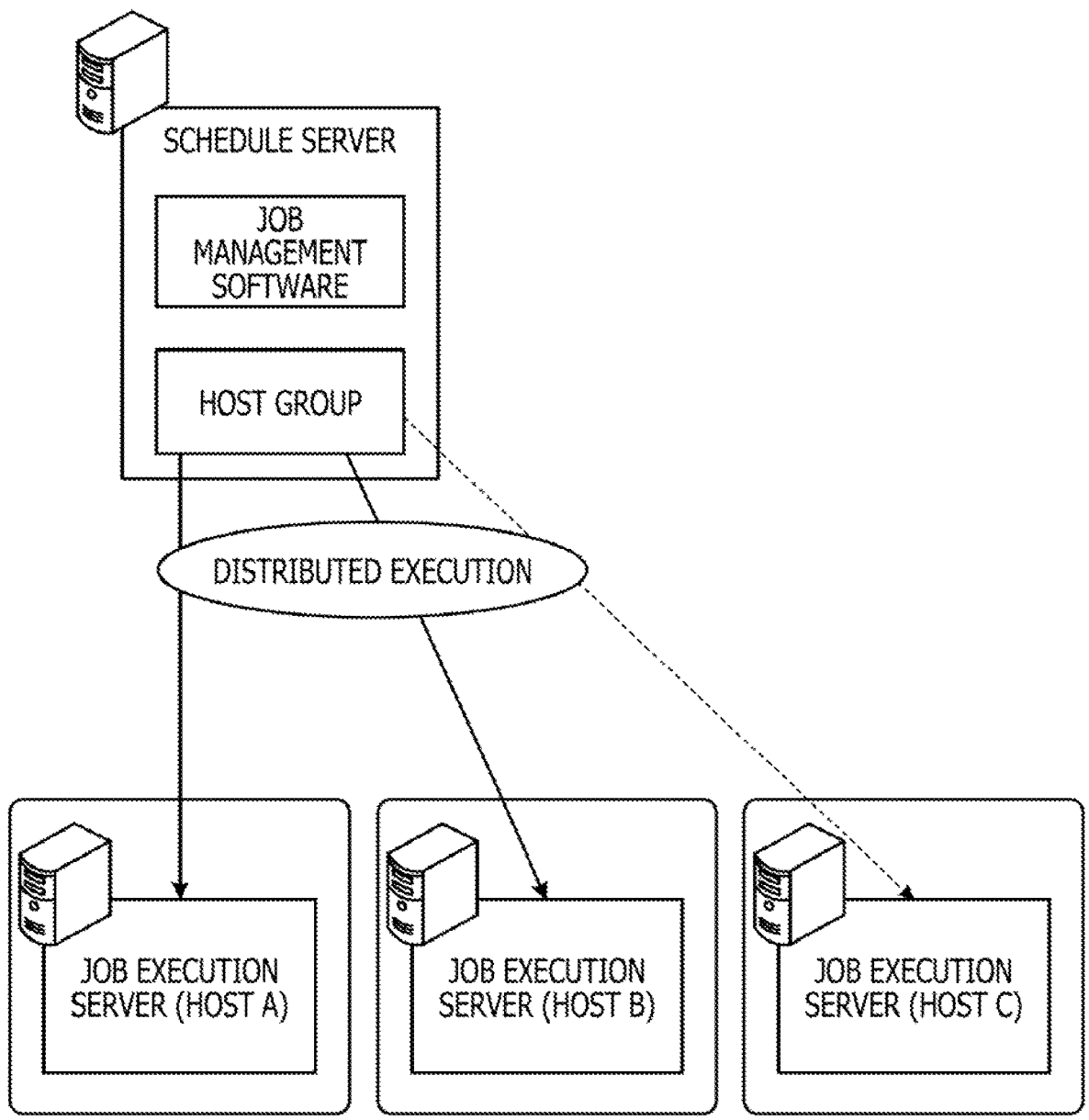
FIG. 9 is a reference diagram illustrating distributed execution using job management software.

FIG. 9 is a reference diagram illustrating distributed execution using job management software. As illustrated in FIG. 9, the number of execution servers necessary for batch processing is prepared in advance. Then, for example, an operation administrator registers in advance information for the number of execution servers necessary for the batch processing in a host group in a schedule server in which the job management software is installed. Then, the job management software of the schedule server detects the execution server with less load and loads a specified job to the detected execution server to implement distributed processing.

Furthermore, regarding load balancing, a load balancing control method for a distributed processing system is disclosed, which monitors a load state of each of a plurality of host computers and distributes business processing to a plurality of host computers on the basis of a monitoring result.

However, there is a problem that resources of the unused execution servers are wasted because the maximum number of execution servers prepared are always operated. Therefore, it is necessary to link a distributed execution function of the job management software with the autoscale function provided by the cloud.

Figure 10:
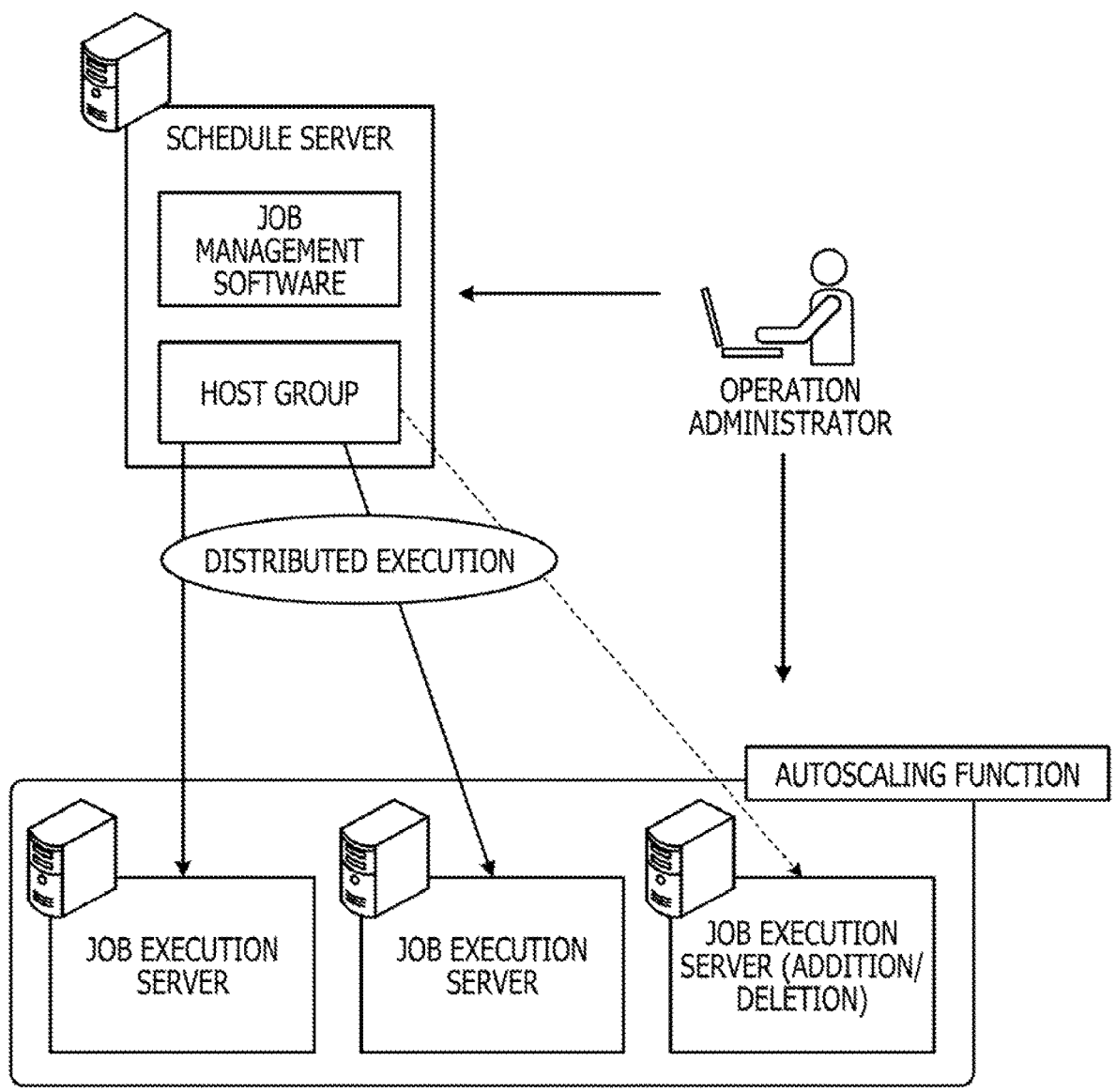
FIG. 10 is a reference diagram of a case where the job management software and a cloud are simply linked.

FIG. 10 is a reference diagram of a case where the job management software and the cloud are simply linked. As illustrated in FIG. 10, a system of the case where the distributed execution function of the job management software and the autoscale function of the cloud are linked is illustrated. In such a system, <1> the autoscaling function of the cloud performs autoscale at a moment obtained on the basis of resource planning or metrics. <2> The operation administrator confirms a host name of the execution server added or deleted by autoscale. <3> The operation administrator edits the host group of the schedule server. Then, the job management software of the schedule server executes jobs in a distributed manner on the basis of the host group.

However, even if the job management software and the cloud are simply linked, there is a problem that the host group managed by the job management software is not able to be changed in a timely manner. That is, since the operation administrator manually confirms the host name of the execution server added or deleted by autoscale and edits the host group, the host group is not able to be changed in a timely manner.

One aspect of the present embodiment is to change the host group managed by the job management software in a timely manner in a case where the job management software and the cloud are linked.

Hereinafter, an embodiment of a job operation program, a job operation system, and a job operation method disclosed in the present application will be described in detail with reference to the drawings. Note that the present embodiment is not limited to the embodiment.

Embodiment

Figure 1:
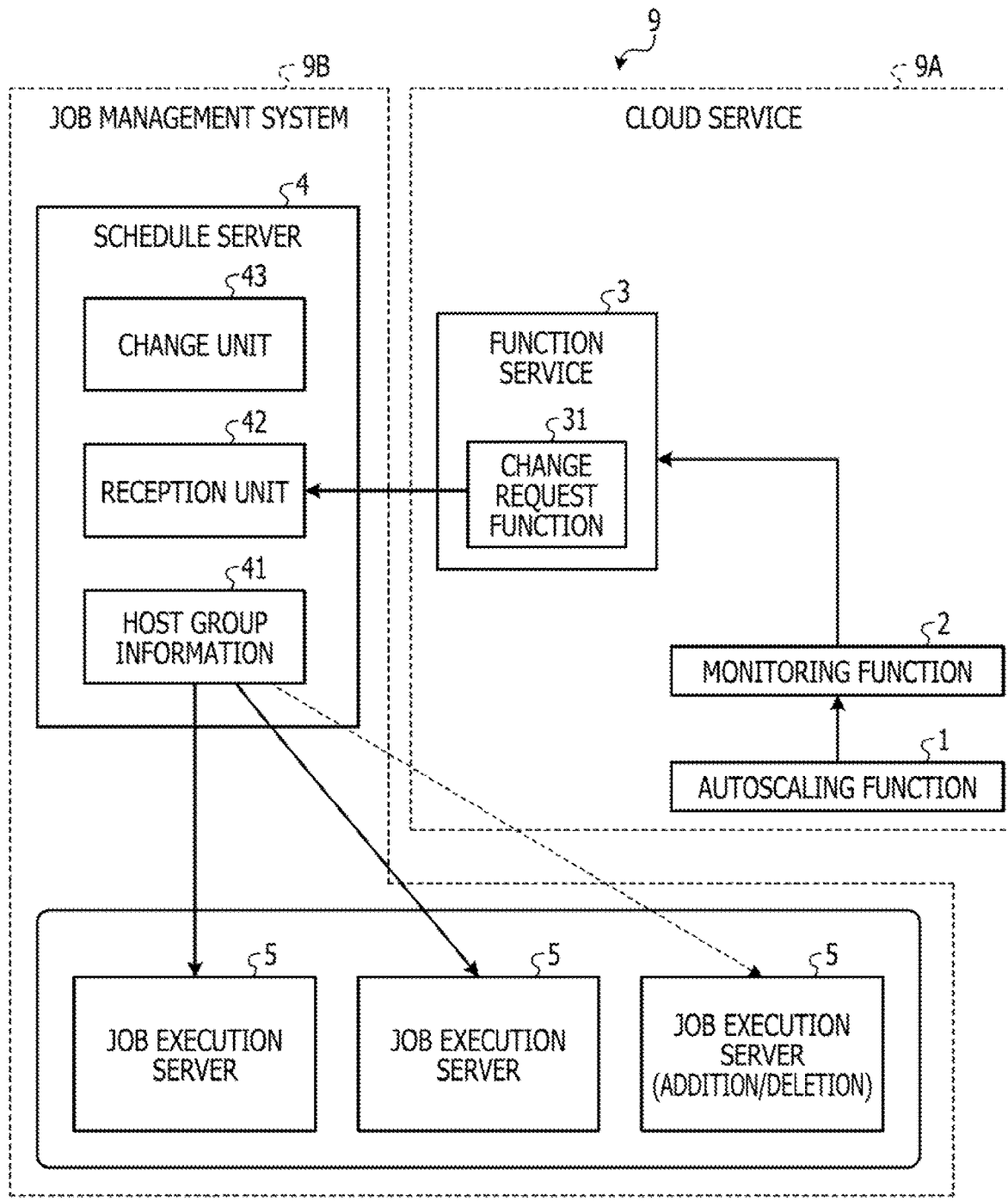
FIG. 1 is a diagram illustrating an example of a functional configuration of a job operation system according to an embodiment.

FIG. 1 is a diagram illustrating an example of a functional configuration of a job operation system according to an embodiment. As illustrated in FIG. 1, a job operation system 9 operates a job by linking a job management system 9B with a cloud service 9A. The job management system 9B distributes and executes batch processing of executing a plurality of jobs in a predetermined order in a plurality of job execution servers 5. The cloud service 9A is a service equipped with an autoscaling function 1. Then, in the job operation system 9, a function service 3 included in the cloud service 9A extracts host information and autoscale type of the job execution server 5 to be autoscaled at a moment of autoscaling of one of the job execution servers 5. Then, in the job operation system 9, the schedule server 4 changes host group information 41 on the basis of the extracted host information and autoscale type. Note that the plurality of job execution servers 5 configured on the job management system 9B is mounted on the cloud. Furthermore, it is desirable that the schedule server 4 configured in the job management system 9B is mounted on the cloud.

The cloud service 9A has an autoscaling function 1, a monitoring function 2, and the function service 3. Then, the cloud service 9A generates, for example, the following information before operation. The cloud service 9A generates instances respectively corresponding to the plurality of job execution servers 5 and generates a template of the instances. The cloud service 9A sets up an instance to be autoscaled. The cloud service 9A sets autoscale rules. The autoscale rules are determined from metrics such as specified date and time specified as resource planning or an average central processing unit (CPU) usage of the job execution servers 5, for example.

The autoscaling function 1 autoscales the job execution server 5 in which processing is distributed at a moment of the resource planning and metrics indicated by the autoscale rules. The autoscale includes "scale-in" that reduces the number of job execution servers 5 configuring the job operation system 9, and "scale-out" that increases the number of job execution servers 5.

Furthermore, the autoscaling function 1 deletes the job execution server 5 to be scaled in on the basis of a function to delay a period from the occurrence of scale-in to when the machine to be scaled in is actually deleted. For the function to delay, for example, setting of life cycle hook (deletion pause) may be used. The time of deletion pause may be, for example, one hour as a default and two hours as a maximum. Thereby, the autoscaling function 1 can prevent the instance from being deleted at the same time as scale-in. Note that the function to delay is set by the operation administrator. Thereby, the autoscaling function 1 can prevent abnormal completion due to disconnection of the batch processing being executed by the job execution server 5 by scale-in.

Monitoring function 2 monitors events. For example, the monitoring function 2 acquires an event of autoscale occurrence. Then, the monitoring function 2 activates a change request function of the host group uploaded to the function service 3 and transmits event information as a parameter. The event information referred to here is information of the event of autoscale occurrence, and includes, for example, a virtualization instance ID corresponding to the job execution server 5 to be autoscaled and the autoscale type. The autoscale type includes information indicating scale-in or information indicating scale-out.

The function service 3 is provided with the change request function 31 of the host group in an operable manner. Note that the change request function 31 of the host group is uploaded to the function service 3 in advance. For example, the change request function 31 activated by the monitoring function 2 extracts the virtualization instance ID to be autoscaled from the event information passed as a parameter at the time of activation. The change request function 31 acquires a host name from the extracted virtualization instance ID using a tool provided by the cloud service 9A. The host name here refers to a private IPv4 address assigned at the time of generating the instance, as an example. Furthermore, an example of such a tool includes software development kit (SDK). In addition, the change request function 31 extracts the autoscale type from the event information. Then, in a case where the extracted autoscale type is scale-in, the change request function 31 transmits a request to delete the acquired host name from a configuration host to the schedule server 4. Furthermore, in a case where the extracted autoscale type is scale-out, the change request function 31 transmits a request to add the acquired host name to the configuration host to the schedule server 4.

The schedule server 4 has the host group information 41, a reception unit 42, and a change unit 43.

The host group information 41 manages the host group. The host group is a group of the host names corresponding to the job execution servers 5 configured to execute the batch processing. In the batch processing, a plurality of jobs is executed in a predetermined order. The host group information 41 generates the host group information 41 with the instances generated by the cloud service 9A as the configuration hosts before operation. As an example, "host A, host B, host C" is stored in the host group information 41. Here, the host A, the host B, and the host C are the host names respectively corresponding to the job execution servers 5. For example, when the job execution server 5 corresponding to the host C is scaled in by the autoscaling function 1, the schedule server 4 deletes the host C of the host group information 41 at timing when receiving a request to change the configuration host from the change request function 31.

The reception unit 42 receives the request to change the configuration host transmitted from the function service 3. For example, the reception unit 42 accepts the request to delete the configuration host having the host name set as a parameter. Furthermore, the reception unit 42 accepts the request to add the configuration host having the host name set as a parameter.

The change unit 43 changes the host group information 41. For example, in the case where the reception unit 42 accepts the request to delete the host name of the configuration host, the change unit 43 executes processing of deleting the corresponding host name from the host group information 41. Furthermore, in the case where the reception unit 42 accepts the request to add the host name of the configuration host, the change unit 43 executes processing of adding the corresponding host name to the host group information 41. Thereby, the change unit 43 can change the host group information 41 managed by the schedule server 4 in a timely manner.

[Sequence of Processing of Job Operation System]

Figure 2:
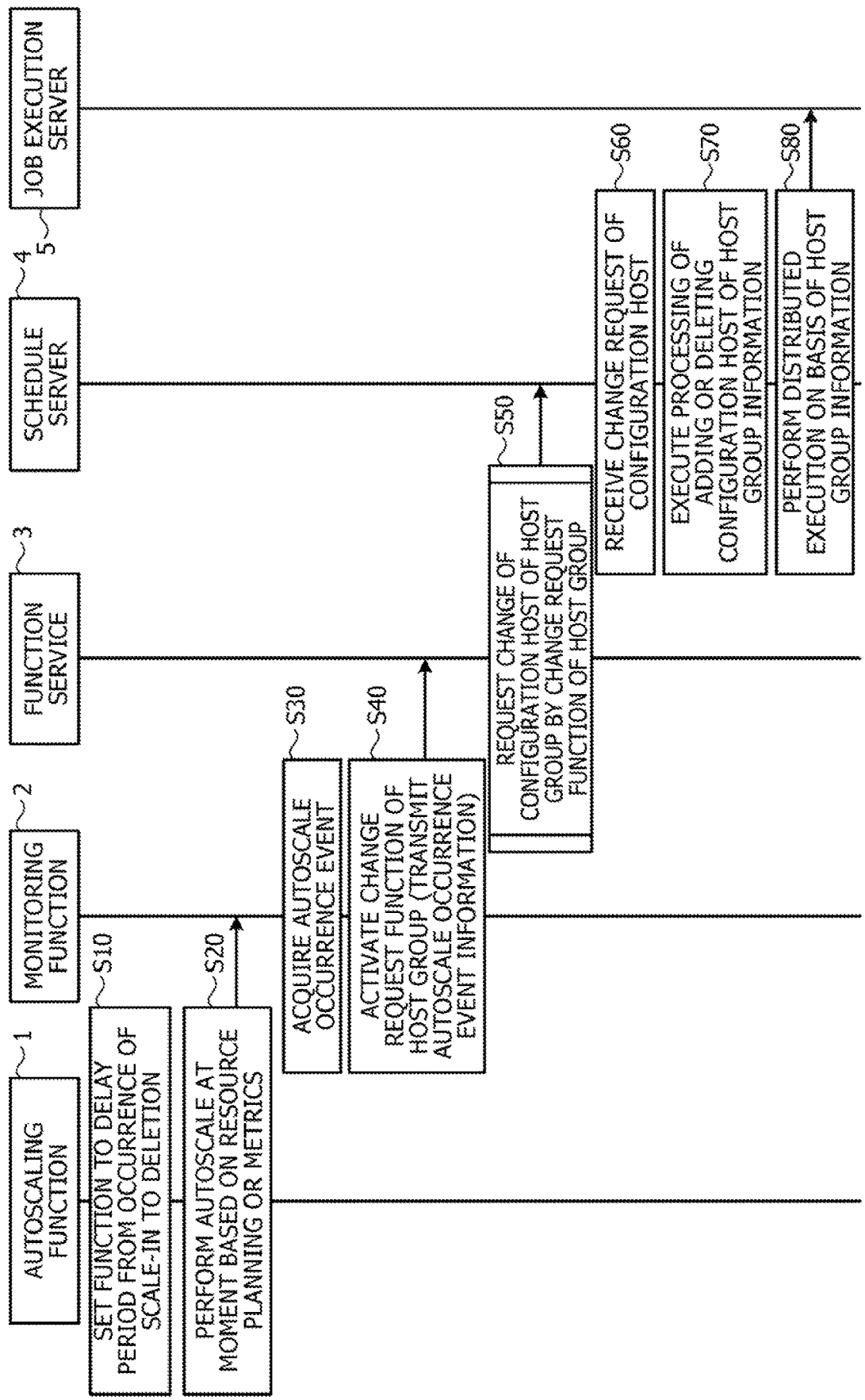
FIG. 2 is a diagram illustrating an example of a sequence of processing of a job operation system according to the embodiment.

FIG. 2 is a diagram illustrating an example of a sequence of processing of a job operation system according to the embodiment. Note that the host group information 41 is generated in the schedule server 4. Then, the schedule server 4 distributes and executes the batch processing of executing a plurality of jobs in a predetermined order on the plurality of job execution servers 5.

First, in the autoscaling function 1, the operation administrator sets the function to delay the period from occurrence of scale-in to deletion (S10). The autoscaling function 1 autoscales the job execution server 5 in which processing is distributed at a moment of the resource planning and metrics (S20).

For example, the monitoring function 2 acquires the event of autoscale occurrence (S30). Then, the monitoring function 2 activates the change request function of the host group (S40). For example, the monitoring function 2 acquires the event information of autoscale occurrence.

The function service 3 requests change of the configuration host of the host group by the change request function of the host group (S50). Note that a flowchart of the processing of the function service 3 will be described below.

The schedule server 4 accepts the request to change the configuration host (S60). For example, the reception unit 42 accepts the request to delete the configuration host having the host name set as a parameter. Furthermore, the reception unit 42 accepts the request to add the configuration host having the host name set as a parameter.

Then, the schedule server 4 executes addition processing or deletion processing for the configuration host of the host group in response to the request to change the configuration host (S70). For example, in the case where the request to delete the host name of the configuration host is accepted, the change unit 43 executes processing of deleting the corresponding host name from the host group information 41. Furthermore, in the case where the request to add the host name of the configuration host is accepted, the change unit 43 executes processing of adding the corresponding host name to the host group information 41.

Thereafter, the schedule server 4 distributes and executes the batch processing in the job execution server 5 on the basis of the host group information 41 (S80).

[Flowchart of Processing of Function Service]

Figure 3:
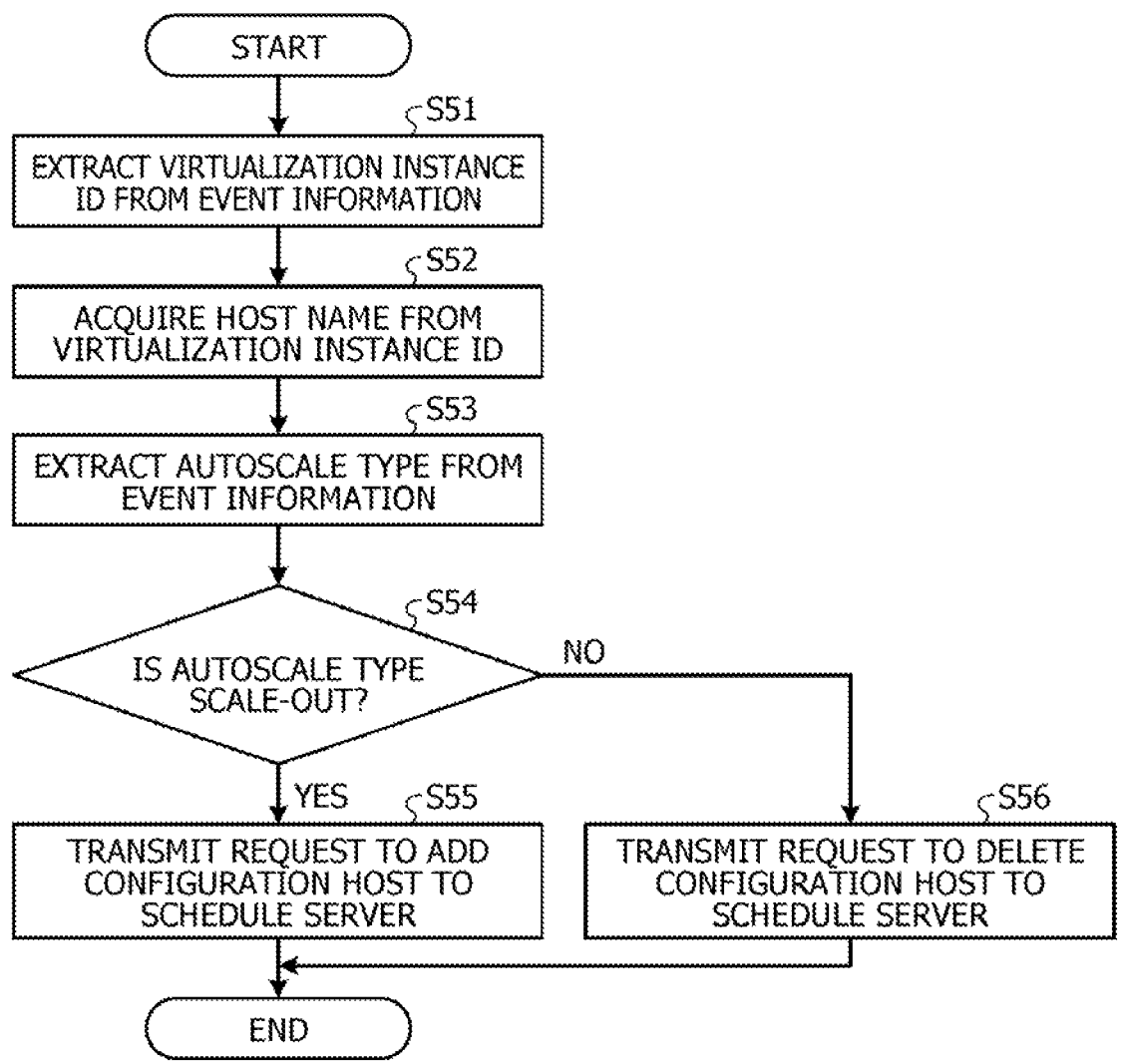
FIG. 3 is a diagram illustrating an example of a flowchart of function service processing according to the embodiment.

FIG. 3 is a diagram illustrating an example of a flowchart of function service processing according to the embodiment. Note that it is assumed that the monitoring function 2 transmits the event information as a parameter, and activates the change request function 31 of the host group.

As illustrated in FIG. 3, the activated change request function 31 extracts the virtualization instance ID from the received event information (step S51). The change request function 31 acquires the host name from the virtualization instance ID using, for example, the SDK (step S52). The change request function 31 extracts the autoscale type from the event information (step S53).

Then, the change request function 31 determines whether the autoscale type is scale-out (step S54). In the case where it is determined that the autoscale type is scale-out (step S54; Yes), the change request function 31 transmits the request to add the configuration host for the acquired host name to the schedule server 4 (step S55). Then, the change request function 31 terminates the process.

On the other hand, in the case where it is determined that the autoscale type is scale-in (step S54; No), the change request function 31 transmits the request to delete the configuration host for the acquired host name to the schedule server 4 (step S56). Then, the change request function 31 terminates the process.

Example of Event Information

Here, the event information of autoscale occurrence will be described with reference to FIG. 4. FIG. 4 is a diagram illustrating an example of the event information of autoscale occurrence. In FIG. 4, the event information of autoscale occurrence is represented in json format. Here is a case where the autoscaling function 1 scales out the virtualization instance ID "abcdef". Then, the monitoring function 2 acquires the event information of the scale-out occurrence as illustrated in FIG. 4 for the virtualization instance ID "abcdef".

In the event information illustrated in FIG. 4, "12345" is set as the event ID. Furthermore, "Scale out" indicating scale-out is set as the autoscale type. "abcdef" is set as the virtualization instance ID.

Example of Request to Add Configuration Host

Here, an example of the request to add the configuration host will be described with reference to FIG. 5. FIG. 5 is a diagram illustrating an example of the request to add the configuration host. In FIG. 5, the request to add the configuration host is described in Hyper Text Markup Language (HTML). Here is a case where the change request function 31 transmits the request to add the host name "VMabcdef" to the configuration host to the schedule server 4.

In the request to add the configuration host illustrated in FIG. 5, "hostgroup1" is set as the host group name to change, and "VMabcdef" is set as the host name to be added to the configuration host.

Example of Request to Delete Configuration Host

Here, an example of the request to delete the configuration host will be described with reference to FIG. 6. FIG. 6 is a diagram illustrating an example of the request to delete the configuration host. In FIG. 6, the request to delete the configuration host is described in HTML. Here is a case where the change request function 31 transmits the request to delete the host name "VMabcdef" from the configuration host to the schedule server 4.

In the request to delete the configuration host illustrated in FIG. 6, "hostgroup1" is set as the host group name to change, and "VMabcdef" is set as the host name to be deleted from the configuration host.

[Effect of Job Operation]

Figure 7:
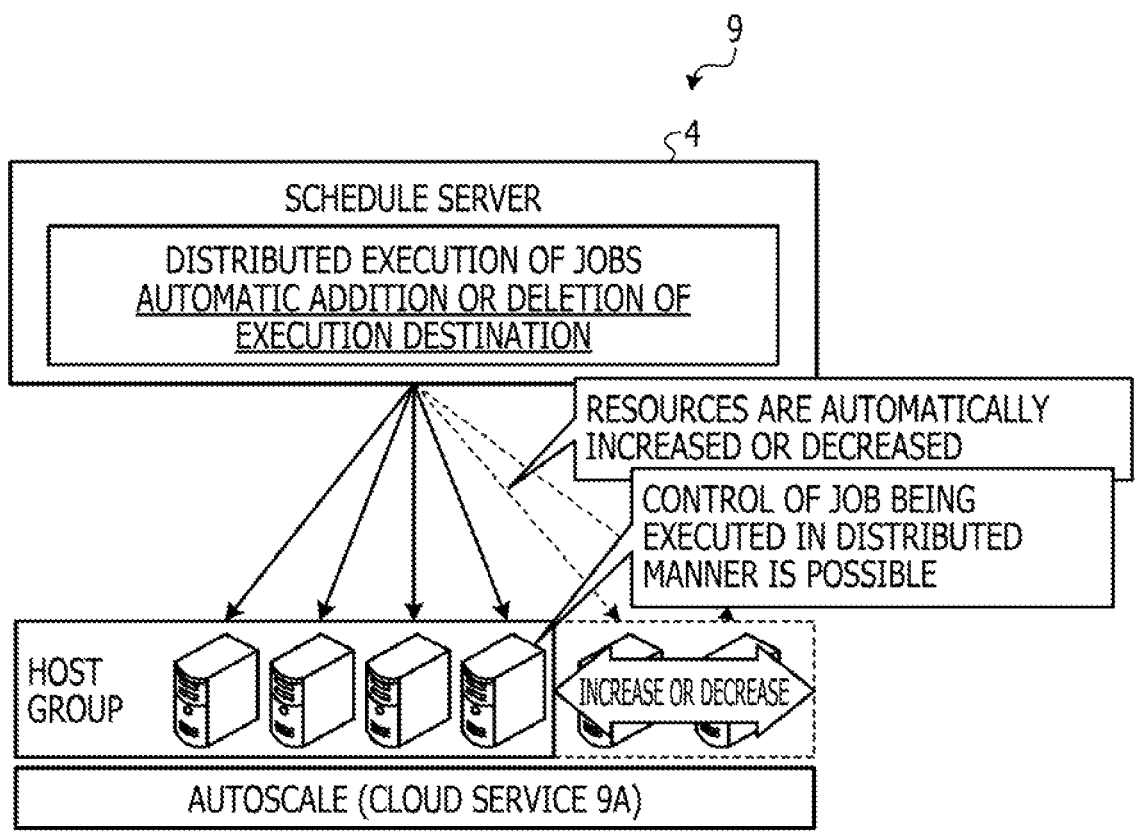
FIG. 7 is a diagram illustrating an effect of job operation according to the embodiment.

FIG. 7 is a diagram illustrating an effect of job operation according to the embodiment. As illustrated in FIG. 7, the job operation system 9 links the job management system 9B with the autoscale of the cloud service 9A. Therefore, the schedule server 4 of the job management system 9B can automatically add and delete the host group that manages the job execution server 5 in which processing is distributed and executed. That is, the schedule server 4 can change the host group that manages the job execution server 5 in a timely manner. Furthermore, by using the function to delay machine deletion by scale-in of the autoscale, it is possible to control the jobs being executed in a distributed manner. That is, the autoscale function (autoscaling function 1) can prevent abnormal completion of the batch processing being executed by the job execution server 5. As a result, the job operation system 9 can increase or decrease the number of job execution servers 5 in the host group according to the situation of the machine such as non-use, thereby operating the jobs with an optimum amount of resources.

Effects of Embodiment

According to the above-described embodiment, the job operation system 9 links the schedule server 4 that executes the batch processing of executing a plurality of jobs in a predetermined order to the plurality of job execution servers 5 in a distributed manner with the cloud service 9A equipped with the autoscaling function 1. The cloud service 9A extracts, using the function service 3 included in the cloud service 9A, the host information and the autoscale type to be autoscaled at a moment of autoscaling of one of the job execution servers 5. The schedule server 4 changes the host group information 41 on the basis of the extracted host information and autoscale type. According to the configuration, the job operation system 9 can change the host group information 41 managed by the schedule server 4 in a timely manner by linking the schedule server 4 with the cloud service 9A equipped with the autoscaling function 1.

Furthermore, according to the above-described embodiment, the cloud service 9A extracts the instance identifier of the job execution server 5 to be autoscaled and the autoscale type from the event information of autoscale, using the function to request change of the host group information 41 using the function service 3, and acquires the host information of the corresponding job execution server 5 from the extracted instance identifier. Then, the cloud service 9A transmits the request to change the host group information 41 according to the extracted autoscale type to the schedule server 4 from the function to request change of the host group information 41. According to the configuration, the job operation system 9 can link the schedule server 4 and the autoscale of the cloud service 9A by using the function of the function service 3, and can change the host group information 41 of the schedule server 4 in a timely manner.

Furthermore, according to the above-described embodiment, the schedule server 4 changes the host group information 41 at the timing of receiving the request to change the host group information 41. According to the configuration, the schedule server 4 can change the host group information 41 in real time.

Furthermore, according to the above-described embodiment, in the case where the autoscale is scale-in indicating deletion, the autoscaling function 1 executes autoscale of deleting the job execution server 5 to be autoscaled on the basis of the setting of a delay time from the moment of autoscale to deletion of the job execution server 5. According to the configuration, the job operation system 9 can prevent abnormal completion of the batch processing being executed by the job execution server 5 by using the setting of a delay time of the autoscale.

[Others]

Note that the autoscaling function 1, each of the monitoring function 2, and the function service 3 in the cloud service 9A may be executed by an information processing device or a virtual machine on the cloud service 9A. Furthermore, the autoscaling function 1, the monitoring function 2 and the function service 3 in the cloud service 9A may be executed by one information processing device or one virtual machine on the cloud service 9A.

Furthermore, in the above-described embodiment, each illustrated configuration element of the schedule server 4 does not always have to be physically configured as illustrated in the figure. In other words, specific modes of distribution and integration of the schedule server 4 are not limited to the illustrated modes, and all or a part thereof may be functionally or physically distributed and integrated in any unit depending on various loads, use situations, or the like. For example, the change unit 43 may be distributed to a first change unit that executes additional processing of the configuration host and a second change unit that executes deletion processing of the configuration host. Furthermore, the reception unit 42 and the change unit 43 may be integrated.

Figure 8:
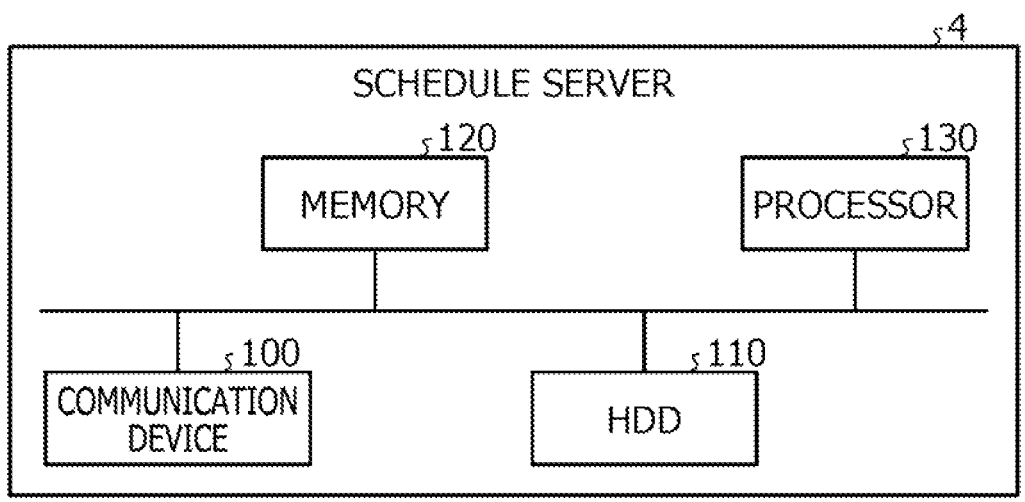
FIG. 8 is a diagram for describing a hardware configuration example.

Furthermore, various types of processing described in the embodiment above can be implemented by a computer such as a personal computer or a workstation executing programs prepared in advance. Therefore, hereinafter, a hardware configuration example of the schedule server 4, which is responsible for a part of the job operation program that implements similar functions to the job operation system 9 illustrated in FIG. 1, will be described. Note that the autoscaling function 1, monitoring function 2, and function service 3, which are responsible for other parts of the job operation program that implements similar functions to the job operation system 9 illustrated in FIG. 1, have a similar hardware configuration. Thus, the description is omitted. FIG. 8 is a diagram for describing a hardware configuration example.

As illustrated in FIG. 8, a schedule server 4 includes a communication device 100, a hard disk drive (HDD) 110, a memory 120, and a processor 130. Furthermore, the units illustrated in FIG. 8 are mutually connected to each other by a bus or the like.

The communication device 100 is a network interface card or the like and communicates with another device. The HDD 110 stores databases (DBs) and programs that activate the functions illustrated in FIG. 1.

The processor 130 has a cache memory mounted, and reads a program that executes processing similar to that of each processing unit illustrated in FIG. 1 from the HDD 110 or the like, and loads it in the memory 120, thereby activating a process that implements each function described with reference to FIG. 1 or the like. For example, this process executes a function similar to that of each processing unit included in the schedule server 4. Specifically, the processor 130 reads a program having a function similar to the reception unit 42, the change unit 43, and the like from the HDD 110 or the like. Then, the processor 130 executes a process of executing similar processing to the reception unit 42, the change unit 43, and the like.

In this way, the schedule server 4 operates as an information processing device that executes a part of the job operation method by reading and executing the program. Furthermore, the schedule server 4 can also implement functions similar to the functions of the above-described embodiments by reading the program mentioned above from a recording medium by a medium reading device and executing the read program mentioned above. Note that the program mentioned in the other embodiment is not limited to being executed by the schedule server 4. For example, the present embodiment may be similarly applied to a case where another computer or server executes the program, or a case where these computer and server cooperatively execute the program.

This program may be distributed via a network such as the Internet. Furthermore, this program may be recorded on a computer-readable recording medium such as a hard disk, flexible disk (FD), compact disc read only memory (CD-ROM), magneto-optical disk (MO), or digital versatile disc (DVD), and may be executed by being read from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a job operation program for causing a computer to execute processing comprising:
   linking a schedule server that distributes batch processing of executing a plurality of jobs in a predetermined order to a plurality of machines and executes the batch processing with a cloud service equipped with an autoscale function, extracting host information to be autoscaled and an autoscale type using a function service included in the cloud service at a moment of autoscaling of one of the plurality of machines; and
   adding to or deleting from, a host name of a machine indicated by the extracted host information, a host group in which host names of one or more machines of the plurality of machines which execute the plurality of jobs are registered and which is stored in the schedule server based on the autoscale type,
   wherein the autoscale is type scale-in indicating deletion, the autoscale function executes autoscale of deleting the one of the plurality of machines to be autoscaled based on a setting of a delay time comprising a default and maximum time from the moment of autoscale to deletion of the one of the plurality of machines while preventing the one of the plurality of machines from being deleted at a same time as the autoscale function is being executed for the one of the plurality of machines.

2. The non-transitory computer-readable recording medium according to claim 1, wherein the extracting includes extracting an instance identifier of a machine to be autoscaled and the autoscale type from event information of autoscale, and acquiring the host information of the corresponding machine from the extracted instance identifier, using a function to request change of the host group in the function service, and a request to change the host group according to the extracted autoscale type is transmitted from the function to the schedule server.

3. The non-transitory computer-readable recording medium according to claim 2, wherein the changing includes changing the host group at timing when the schedule server receives the request to change the host group.

4. The non-transitory computer-readable recording medium according to claim 1, wherein the setting of a delay time is a life cycle hook function that temporarily stops the deletion of the machine.

5. A job operation system comprising:
   a schedule server that distributes batch processing of executing a plurality of jobs in a predetermined order to a plurality of machines and executes the batch processing,
   linking the schedule server with an autoscale function, host information to be autoscaled and an autoscale type are extracted using a function service included in a cloud service at a moment of autoscaling of one of the plurality of machines; and
   a processor of the schedule server adds to or deletes from, a host name of a machine indicated by the extracted host information, a host group in which host names of one or more machines of the plurality of machines which execute the plurality of jobs are registered and which is stored in the schedule server based on the autoscale type,
   wherein the autoscale is type scale-in indicating deletion, the autoscale function executes autoscale of deleting the one of the plurality of machines to be autoscaled based on a setting of a delay time comprising a default and maximum time from the moment of autoscale to deletion of the one of the plurality of machines while preventing the one of the plurality of machines from being deleted at a same time as the autoscale function is being executed for the one of the plurality of machines.

6. A job operation method comprising:
   linking a schedule server that distributes batch processing of executing a plurality of jobs in a predetermined order to a plurality of machines and executes the batch processing with a cloud service equipped with an autoscale function, extracting, by a computer, host information to be autoscaled and an autoscale type using a function service included in the cloud service at a moment of autoscaling of one of the plurality of machines; and
   adding to or deleting from, a host name of a machine indicated by the extracted host information, a host group in which host names of one or more machines of the plurality of machines which execute the plurality of jobs are registered and which is stored in the schedule server based on the autoscale type,
   wherein the autoscale is type scale-in indicating deletion, the autoscale function executes autoscale of deleting the one of the plurality of machines to be autoscaled based on a setting of a delay time comprising a default and maximum time from the moment of autoscale to deletion of the one of the plurality of machines while preventing the one of the plurality of machines from being deleted at a same time as the autoscale function is being executed for the one of the plurality of machines.

* * * * *